United States Patent
Cho

(10) Patent No.: US 9,695,754 B2
(45) Date of Patent: Jul. 4, 2017

(54) EXHAUST BRAKE FOR MAINTAINING BACK PRESSURE

(71) Applicant: HYUNDAI MOTOR COMPANY, Seoul (KR)

(72) Inventor: Jae Seol Cho, Jeonju-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/933,830

(22) Filed: Nov. 5, 2015

(65) Prior Publication Data

US 2016/0222842 A1   Aug. 4, 2016

(30) Foreign Application Priority Data

Jan. 30, 2015   (KR) .................. 10-2015-0014971

(51) Int. Cl.
F02D 9/06   (2006.01)
(52) U.S. Cl.
CPC ................. F02D 9/06 (2013.01); *Y02T 10/16* (2013.01)
(58) Field of Classification Search
CPC .. F02D 9/06; F02D 9/102; F02D 13/04; F01L 7/06; F01L 7/18; F01L 13/06; B60W 10/198; Y02T 10/16
USPC ........... 123/320, 323, 337; 60/324; 251/236, 251/305
See application file for complete search history.

(56) References Cited

U.S. PATENT DOCUMENTS

| | | | | |
|---|---|---|---|---|
| 5,282,399 A * | 2/1994 | Sano | ................ | B60W 10/06 123/323 |
| 5,372,109 A * | 12/1994 | Thompson | ................ | F02D 9/06 123/323 |
| 5,624,100 A * | 4/1997 | Bolte | ................ | F02D 9/1065 251/129.01 |
| 6,179,096 B1 * | 1/2001 | Kinerson | ................ | F01N 13/10 123/323 |
| 6,899,079 B1 * | 5/2005 | Hill | ................ | F02B 25/26 123/323 |
| 7,735,466 B1 * | 6/2010 | Moore | ................ | F02D 9/06 123/323 |
| 7,765,981 B2 * | 8/2010 | Lhote | ................ | F02D 9/06 123/323 |
| 7,849,684 B2 * | 12/2010 | Gerards | ................ | F02D 9/04 60/299 |

(Continued)

FOREIGN PATENT DOCUMENTS

| | | |
|---|---|---|
| JP | 2011-032955 A | 2/2011 |
| JP | 2012-127251 A | 7/2012 |

(Continued)

OTHER PUBLICATIONS

KR20090056607.*

(Continued)

*Primary Examiner* — John Kwon
*Assistant Examiner* — Johnny H Hoang
(74) *Attorney, Agent, or Firm* — McDermott Will & Emery LLP

(57) ABSTRACT

An exhaust brake includes a valve housing allowing an exhaust gas to flow therein. A butterfly gate is installed in the valve housing to block the exhaust gas flow and has a through hole for discharging a portion of the exhaust gas when a back pressure of the exhaust gas is equal to or higher than a reference pressure.

8 Claims, 6 Drawing Sheets

(56) References Cited

U.S. PATENT DOCUMENTS

| | | |
|---|---|---|
| 8,011,347 B2 | 9/2011 | Lhote et al. |
| 2003/0080610 A1* | 5/2003 | Jung ................... B60T 13/00 303/9 |
| 2010/0024767 A1* | 2/2010 | Meneely ............. F01L 13/065 123/323 |
| 2011/0000208 A1* | 1/2011 | Robinson ............ F02B 37/001 60/602 |
| 2013/0104841 A1* | 5/2013 | Jeong .................... F02D 9/06 123/323 |

FOREIGN PATENT DOCUMENTS

| | | |
|---|---|---|
| KR | 10-0448775 B1 | 9/2004 |
| KR | 10-2008-0055418 A | 6/2008 |
| KR | 10-2013-0005607 A | 1/2013 |

OTHER PUBLICATIONS

Drawng Pages of KR20090056607.*
Notice of Allowance dated Apr. 12, 2017, issued in Korean Patent Application No. 10-2015-0014971.

* cited by examiner

EXHAUST BRAKE FOR MAINTAINING BACK PRESSURE

CROSS-REFERENCE TO RELATED APPLICATION

This application is based on and claims the benefit of priority to Korean Patent Application No. 10-2015-0014971, filed on Jan. 30, 2015, in the Korean Intellectual Property Office, the disclosure of which is incorporated herein in its entirety by reference.

TECHNICAL FIELD

The present disclosure relates to an exhaust brake, and more particularly, to an exhaust brake capable of constantly maintaining back pressure.

BACKGROUND

Commercial vehicles such as trucks having heavy loads include an exhaust brake for deceleration when driving downwardly on a hill or driving at a high speed by manipulating a foot brake as a main brake device. Such an exhaust brake forcibly suppresses discharge of an exhaust gas in the air after being burned in a combustion chamber of an engine, thus enabling the engine is able to act as a compressor to obtain braking force.

When the exhaust gas discharge is suppressed, combustion conditions such as an air fuel ratio or the like are may not be satisfied since the gas burned in the combustion chamber cannot be discharged through an exhaust pipe which communicates with an exhaust manifold, resulting in the engine turning off. In order to prevent the engine from turning off, the exhaust brake has a check valve opening when a back pressure has equal to or higher value than a reference pressure value.

However, in the related art, since the check valve protrudes toward the engine, there is a design limitation on an engine room layout. In addition, since a housing is provided to install the check valve therein, the overall weight of a vehicle increases, eventually degrading fuel efficiency.

SUMMARY

The present disclosure has been made to solve the above-mentioned problems occurring in the prior art while advantages achieved by the prior art are maintained intact.

An aspect of the present disclosure provides an exhaust brake with a check valve installed therein, thereby simplifying a layout of an engine room and facilitating installation of the check valve without a separate housing.

According to an exemplary embodiment of the present disclosure, an exhaust brake includes a valve housing allowing an exhaust gas to flow therein. A butterfly gate is installed in the valve housing to block the exhaust gas flow and has a through hole for discharging a portion of the exhaust gas when the exhaust gas has a back pressure equal to or higher than a reference pressure.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings.

As illustrated in FIGS. 1 through 4B, an exhaust brake according to an exemplary embodiment of the present disclosure includes a valve housing 100 installed in an exhaust pipe (not shown) and a butterfly gate 200 installed in the valve housing 100.

Figure 1:
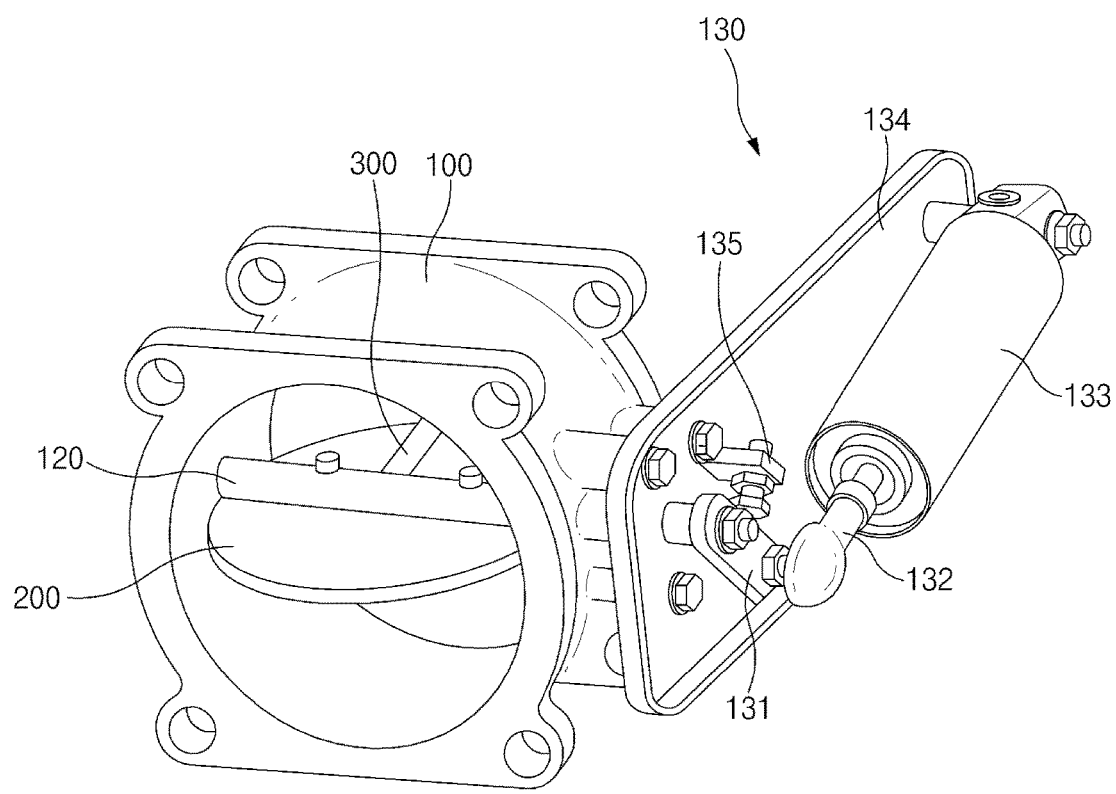
FIG. 1 is a perspective view of an exhaust brake of an exemplary embodiment of the present disclosure.
Figure 2:
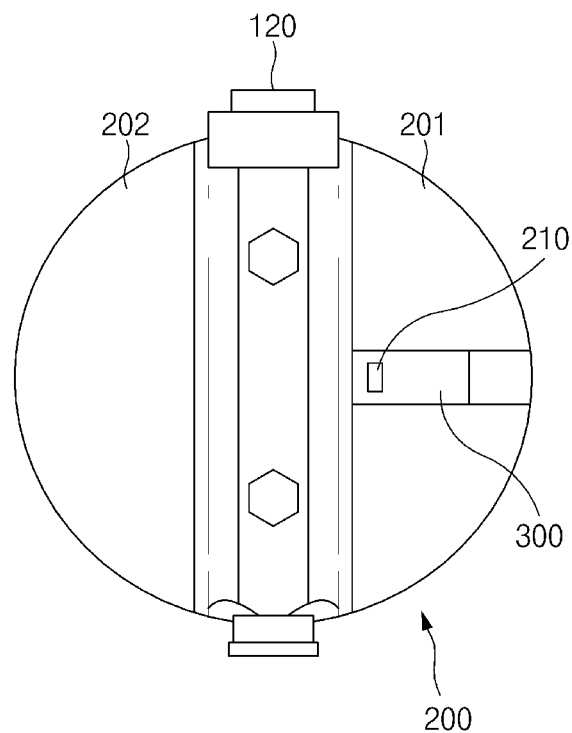
FIG. 2 is a plan view of a butterfly gate provided in the exhaust brake of FIG. 1.
Figure 3A:
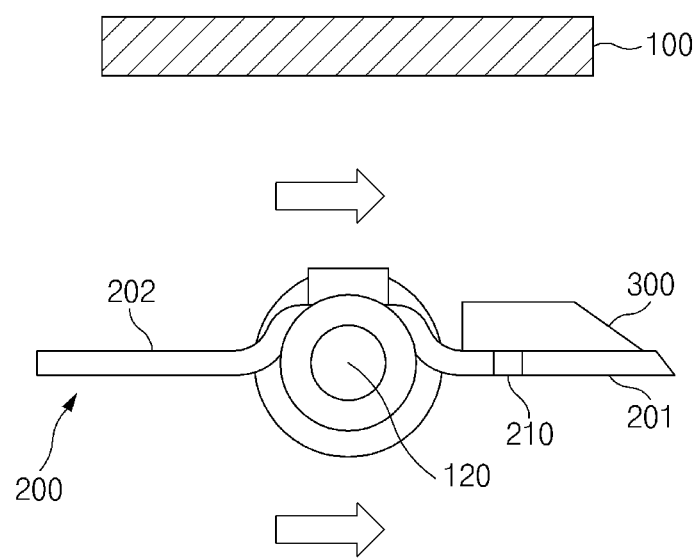
FIGS. 3A and 3B are views illustrating an operation of the butterfly gate provided in the exhaust brake of FIG. 1.
Figure 3B:
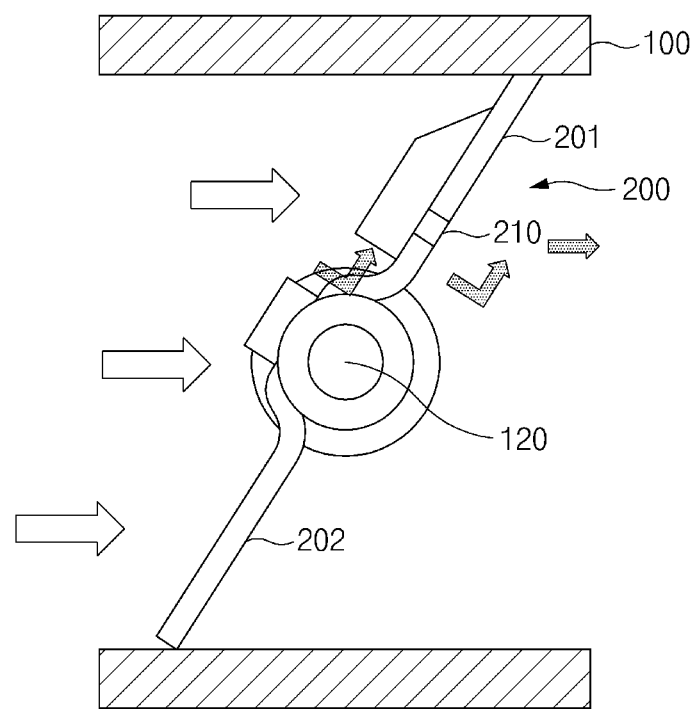

As illustrated in FIG. 3A AND FIG. 3B, The valve housing 100 has a passage in which an exhaust gas flows.

The butterfly gate 200 opens the passage of the valve housing 100 as illustrated in FIG. 3A, and the butteryfly gate 200 blocks the passage of the valve housing 100 as illustrated in FIG. 3B.

A spindle 120 is attached to a central portion of the butterfly gate 200. The spindle 120 is rotatably installed across the valve housing 100. An actuator 130 rotating the spindle 120 is installed outside the valve housing 100.

The butterfly gate 200 has first and second gate portions 201 and 202 which are symmetrical to each other in respect to the spindle 120.

A through hole 210 is formed at one portion of the butterfly gate 200 in order to discharge a portion of an exhaust gas when a back pressure is equal to or higher than a reference pressure. The through hole 210 is formed in at least one of the first and second gate portions 201 and 202 of the butterfly gate 200. In FIGS. 2 through 4B, it is illustrated that the through hole 210 is formed in the first gate portion 201. However, it is not limited to the drawings.

The actuator 130 has a link 131 connected to the spindle 120 in a direction perpendicular to the spindle 120 and a cylinder 133 connected to the link 131.

One side of the link 131 is connected to the spindle 120, and another side of the link 131 is connected to a rod 132 of the cylinder 133.

An installation plate 134 is fixed to one side of the valve housing 100, and the link 131 and the cylinder 133 are installed on the installation plate 134.

A limiter 135 limiting rotation of the link 131 may be installed on the installation plate 134.

A check valve 300 is installed in the through hole 210 of the butterfly gate 200, and opens and blocks the through hole 210 according to back pressure of the exhaust gas.

The check valve 300 includes a valve body 310, a valve member 320 movably installed within the valve body 310, and a spring 330 pressing the valve member 320.

The valve body 310 is installed to correspond to the through hole 210 of the gate 200. A first opening 311 communicating with the through hole 210 is formed at one side of the valve body 310. A second opening 312 is formed block to the first opening 311 and is open toward an upper stream of the butterfly gate 200.

The valve member 320 moves in a linear direction in an internal space of the valve body 310 to open and block the first opening 311 of the valve body 310 and the through hole 210. The valve member 320 is disposed to be adjacent to the first opening 311 and the second opening 312 of the valve body 310.

The spring 330 elastically presses the valve member 320 within the valve body 310, and the valve member 320 may return in a direction in which the first opening 311 is blocked by an elastic force of the spring 330. An adjustment screw 340 adjusting the elastic force of the spring 330 may be provided at another side of the valve body 310.

Figure 4A:
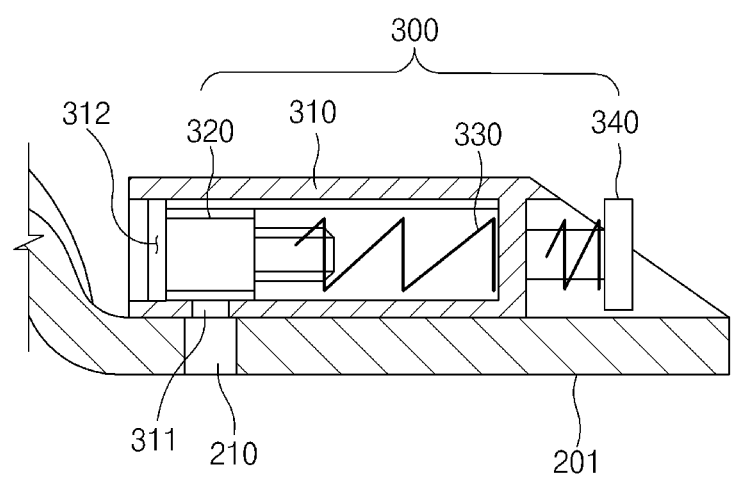
FIGS. 4A and 4B are views illustrating an operation of a check valve installed in the exhaust brake of FIG. 1.

Through this configuration, when the back pressure of the exhaust gas is smaller than the reference pressure, the valve member 320 blocks the first opening 311 and the second opening 312 of the valve body 310 as illustrated in FIG. 4A.

Figure 4B:
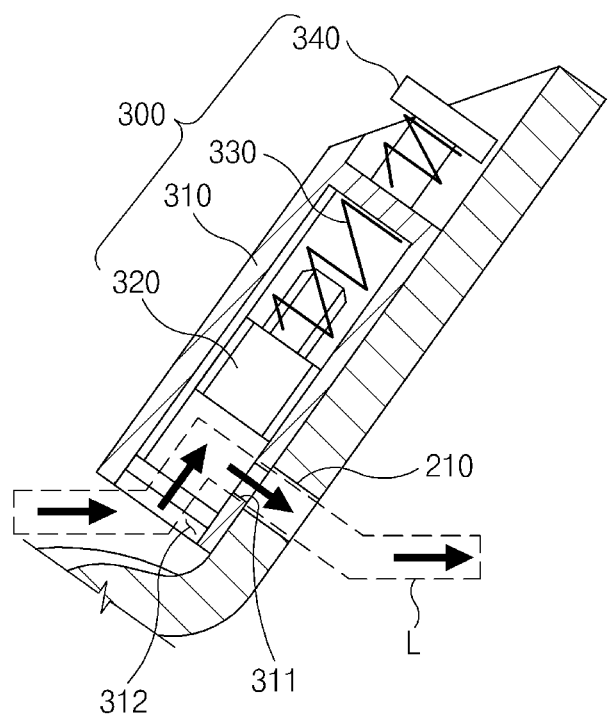

When the back pressure of the exhaust gas is higher than the reference pressure, the valve member 320 moves in a direction in which the elastic force of the spring 330 is overcome by the back pressure of the exhaust gas introduced through the second opening 312, and accordingly, the first opening 311 and the through hole 210 may be opened as illustrated in FIG. 4B.

In this manner, when the valve member 320 moves in a direction in which the first opening 311 is opened, the first opening 311 may be opened toward a lower stream of the butterfly gate 200 to communicate with the second opening 312. Consequently, a bypass flow path L is formed to allow a portion of the exhaust gas to bypass from the upper stream side of the butterfly gate 200 toward the lower stream side of the butterfly gate 200 through the second opening 312 and the first opening 311, and thus, the back pressure of the exhaust gas may be stably maintained.

As described above, according to the exhaust brake of the present disclosure, since the through hole, which discharges a portion of an exhaust gas when a back pressure of the exhaust gas is equal to or higher than a reference pressure, is provided in the butterfly gate, an outer appearance of the butterfly gate is simplified compared with the related art, and thus, an engine room layout may be simplified.

In addition, since a separate housing for installing a check valve is excluded from the exhaust brake, the overall weight of a vehicle may be reduced, thus enhancing fuel efficiency.

Since the check valve is installed in the butterfly gate, a streamline of the exhaust gas which presses the check valve is reduced, thus enhancing a reaction rate of the check valve compared with the related art.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An exhaust brake comprising:
   a valve housing allowing an exhaust gas to flow therein; and
   a butterfly gate installed in the valve housing to block the exhaust gas flow and having a through hole for discharging a portion of the exhaust gas,
   a check valve installed on a front surface of the butterfly gate, the check valve selectively opening and blocking the through hole,
   wherein the check valve includes:
   a valve body having a first opening which communicates with the through hole and an inclination side which is inclined and is directed to a direction of the exhaust gas flow when the butterfly gate blocks the exhaust gas flow;
   a valve member selectively opening and blocking the first opening of the valve body;
   a spring elastically supporting the valve member; and
   an adjustment screw disposed at the inclined side and configured to adjust an elastic force of the spring so that the valve member blocks the first opening when the exhaust gas has a back pressure lower than a reference pressure and the valve member opens the first opening when the exhaust gas has the back pressure equal to or higher than the reference pressure.

2. The exhaust brake according to claim 1, wherein the valve member moves within the valve body to open or block the first opening of the valve body.

3. The exhaust brake according to claim 2, wherein the valve body has a second opening opened toward an upper stream of the butterfly gate.

4. The exhaust brake according to claim 1, further comprising:
   a spindle attached to the butterfly gate and rotatably installed in the valve housing; and
   an actuator configured to rotate the spindle.

5. The exhaust brake according to claim 4, wherein the actuator has a link connected to the spindle in a direction perpendicular to the spindle and a cylinder connected to the link.

6. The exhaust brake according to claim 5, wherein one end of the link is connected to the spindle and another end of the link is connected to a rod of the cylinder.

7. The exhaust brake according to claim 6, wherein an installation plate is fixed to one side of the valve housing, and the link and the cylinder are installed on the installation plate.

8. The exhaust brake according to claim 7, wherein a limiter limiting rotation of the link is installed on the installation plate.

* * * * *